Figure 1:
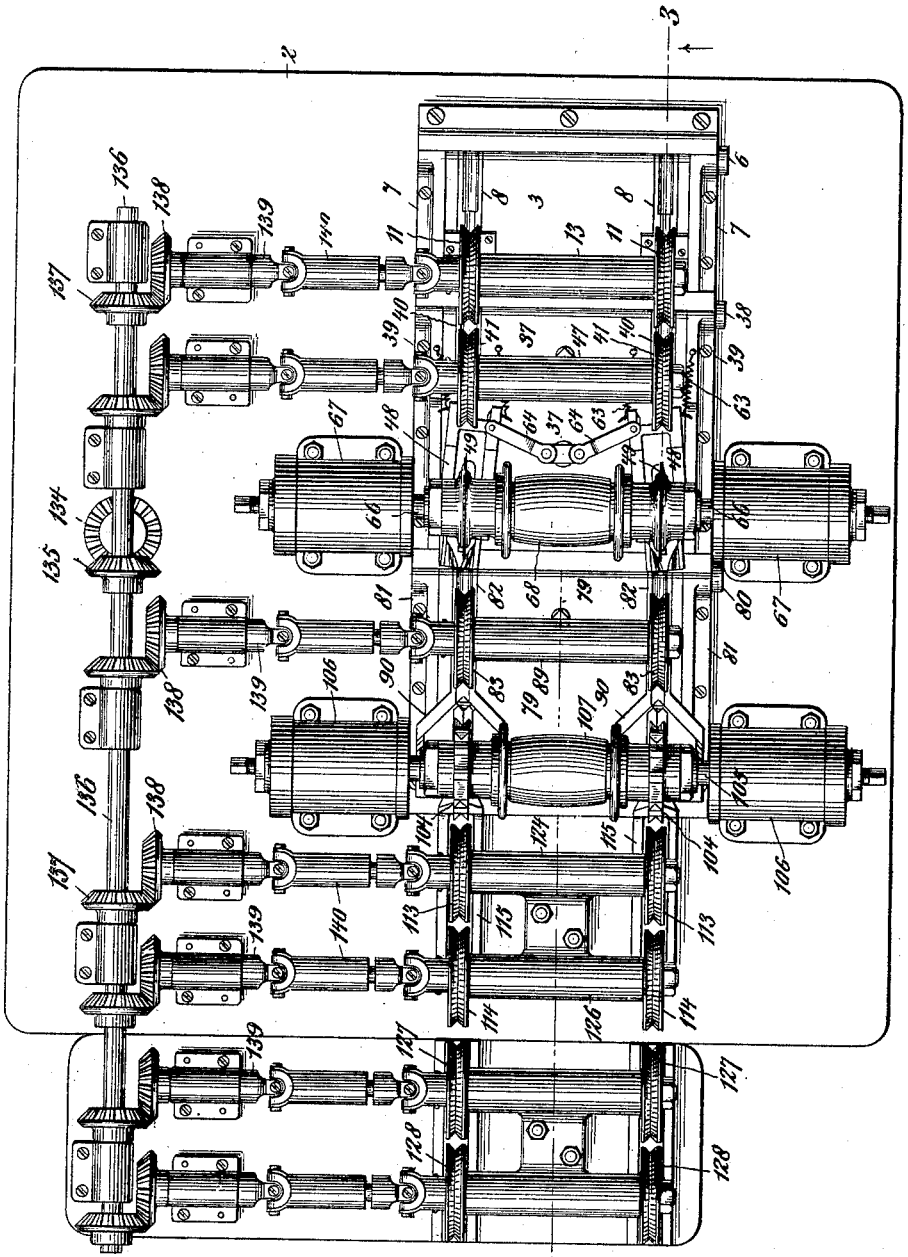

No. 649,678. Patented May 15, 1900.
J. POMEROY & H. W. LARSSON.
MACHINE FOR PREPARING RATAN.
(Application filed July 12, 1898.)
(No Model.) 10 Sheets—Sheet 1.

WITNESSES: INVENTORS
Julian Pomeroy
Henry W. Larsson
BY
Witter & Kenyon
ATTORNEYS.

No. 649,678.  
Patented May 15, 1900.

J. POMEROY & H. W. LARSSON.
MACHINE FOR PREPARING RATAN.
(Application filed July 12, 1898.)

(No Model.)  
10 Sheets—Sheet 2.

WITNESSES:  
INVENTORS  
Julian Pomeroy  
Henry W. Larsson  
BY  
Witter & Kenyon  
ATTORNEYS.

No. 649,678. Patented May 15, 1900.
J. POMEROY & H. W. LARSSON.
MACHINE FOR PREPARING RATAN.
(Application filed July 12, 1898.)
(No Model.) 10 Sheets—Sheet 3.

WITNESSES:

INVENTORS
Julian Pomeroy,
Henry W. Larsson,
BY
Witter & Kenyon
ATTORNEYS.

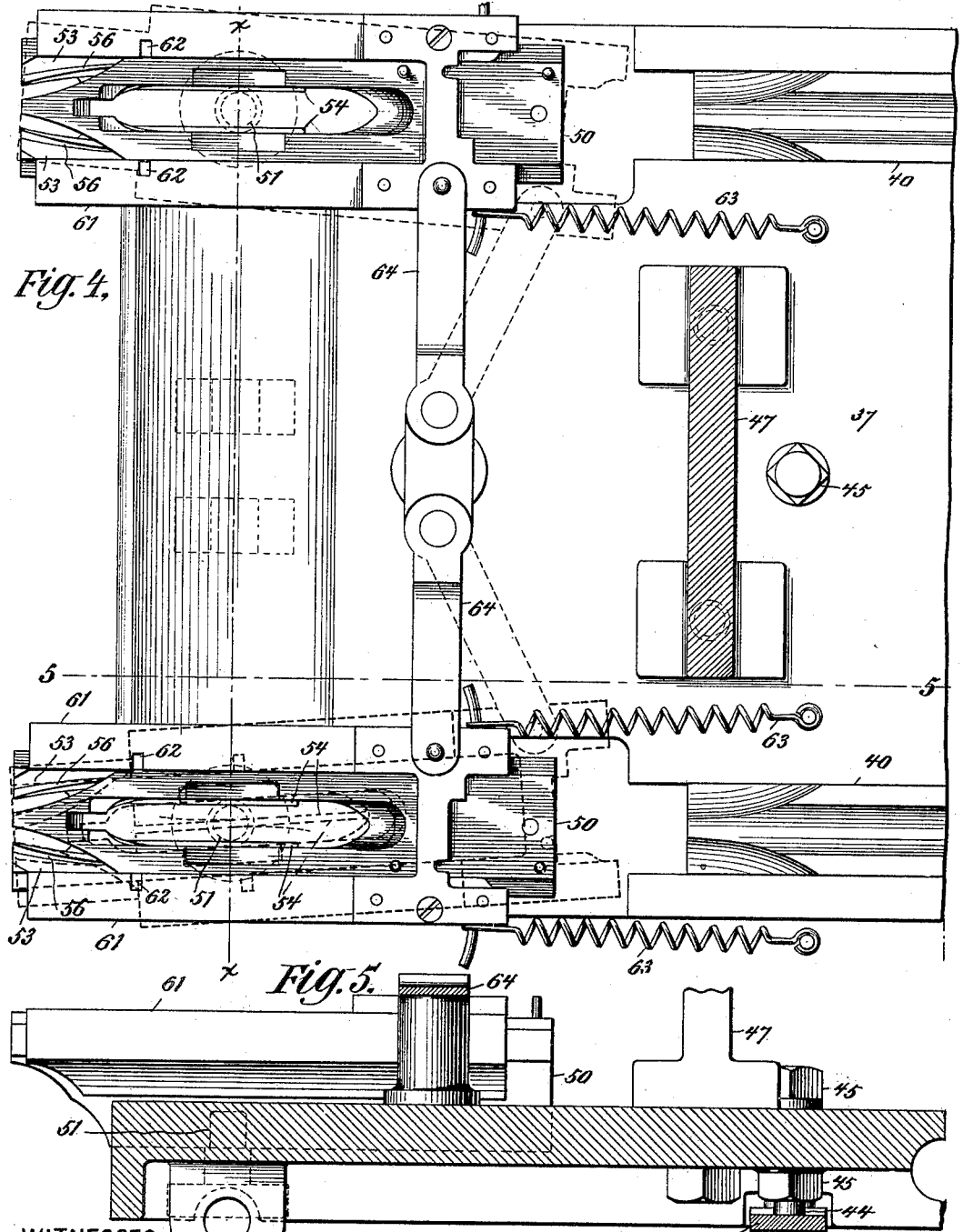

No. 649,678. Patented May 15, 1900.
J. POMEROY & H. W. LARSSON.
MACHINE FOR PREPARING RATAN.
(Application filed July 12, 1898.)
(No Model.) 10 Sheets—Sheet 5.
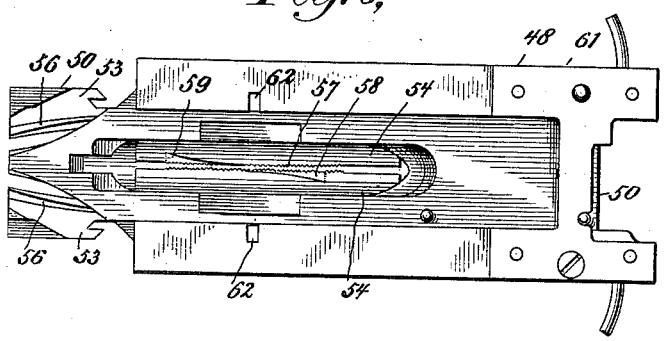
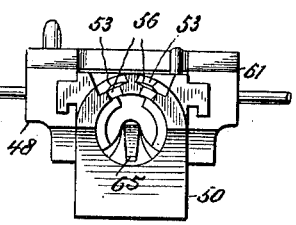
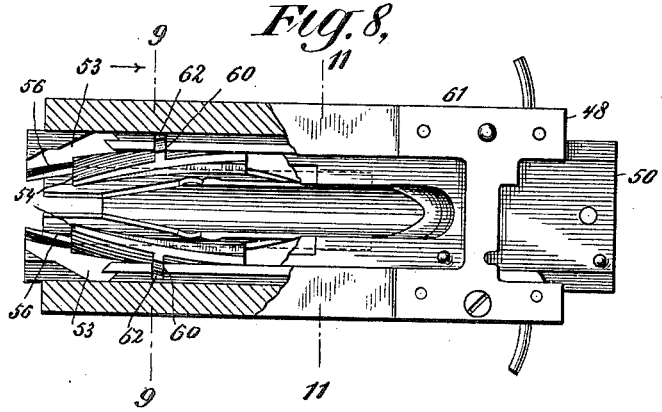
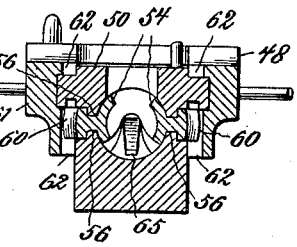
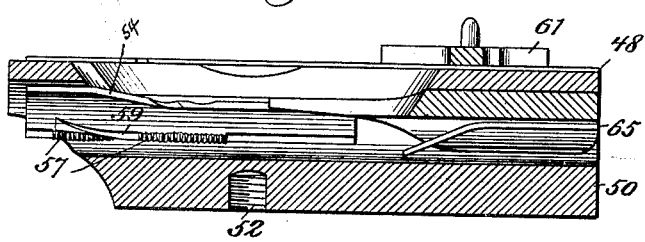
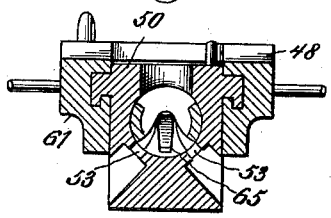
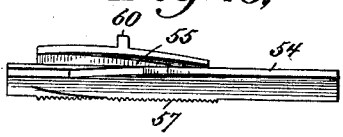
WITNESSES:
INVENTORS
Julian Pomeroy,
Henry W. Larsson,
BY
Witter & Kenyon
ATTORNEYS.

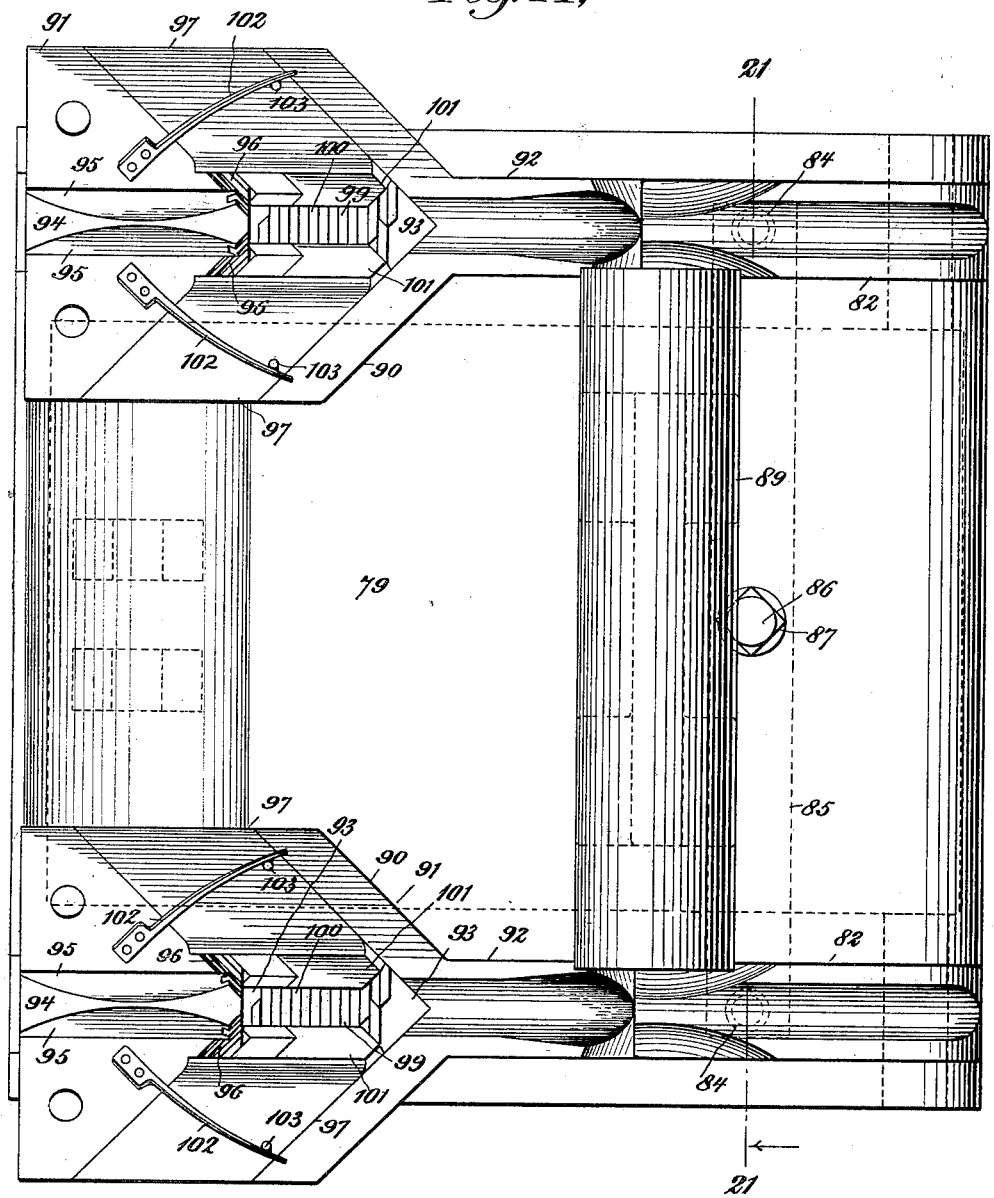

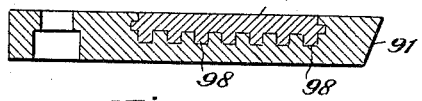
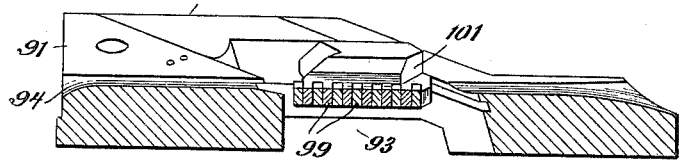
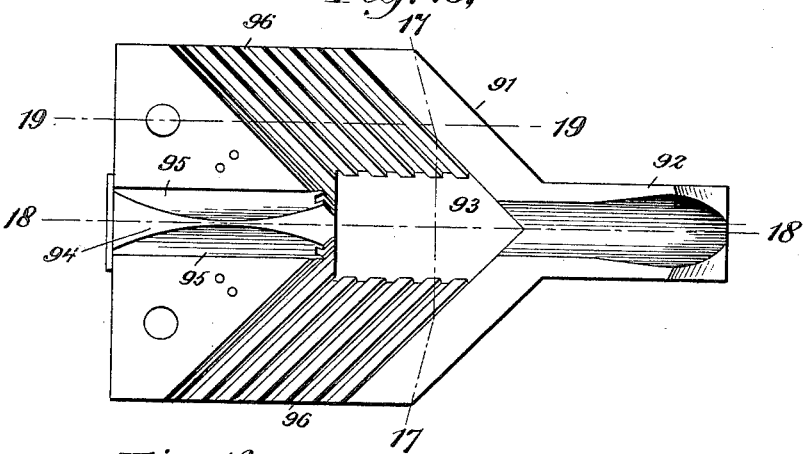
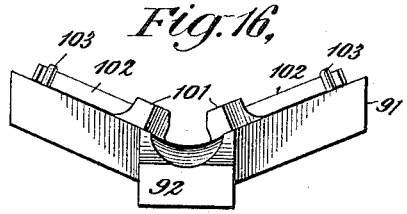
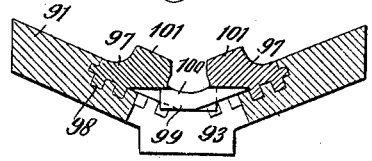
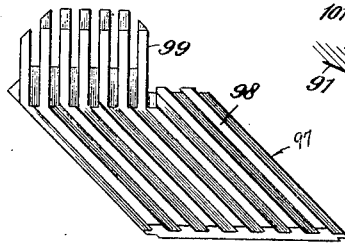
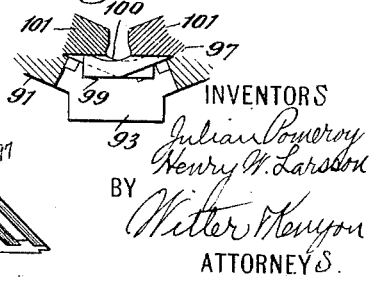

No. 649,678. Patented May 15, 1900.
J. POMEROY & H. W. LARSSON.
MACHINE FOR PREPARING RATAN.
(Application filed July 12, 1898.)
(No Model.) 10 Sheets—Sheet 8.
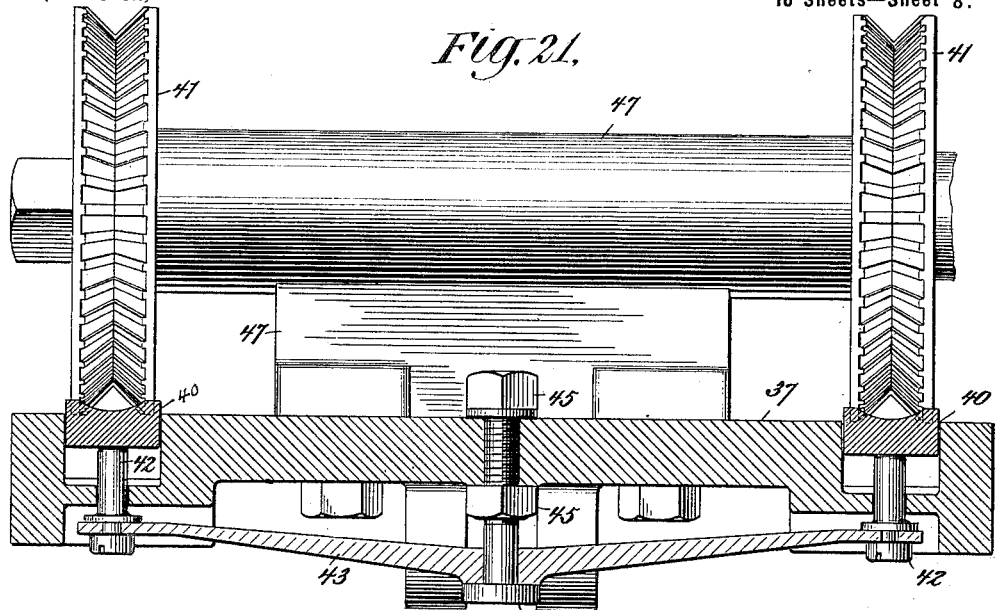
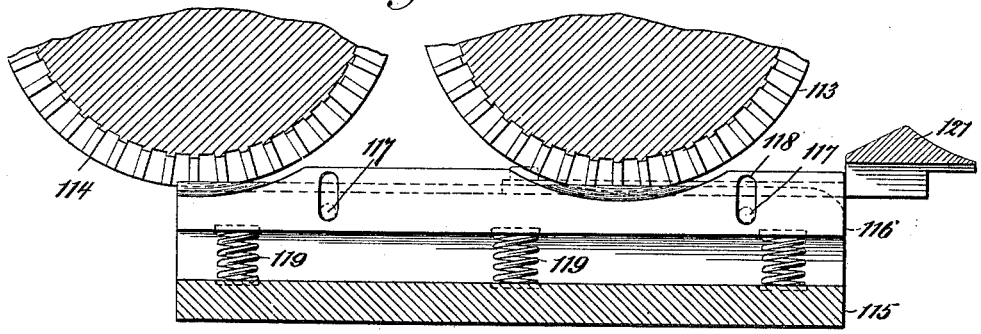
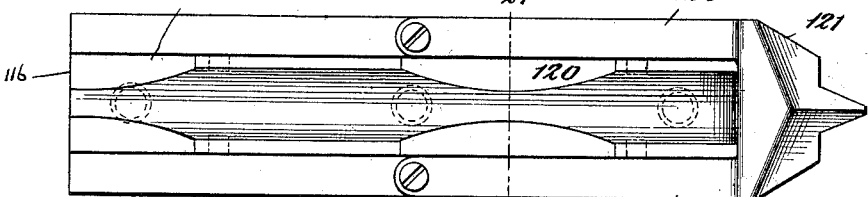
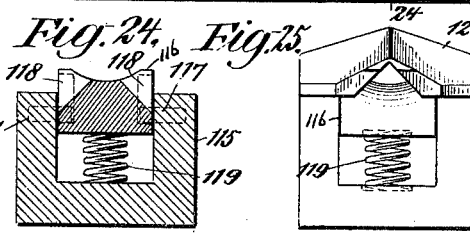
WITNESSES: INVENTORS
Julian Pomeroy
Henry W. Larsson
BY
Witter & Kenyon
ATTORNEYS.
THE NORRIS PETERS CO., PHOTO-LITHO., WASHINGTON, D. C.

No. 649,678. Patented May 15, 1900.
J. POMEROY & H. W. LARSSON.
MACHINE FOR PREPARING RATAN.
(Application filed July 12, 1898.)
(No Model.) 10 Sheets—Sheet 9.

WITNESSES:
Geo. W. Kelly
Jas. C. Howell.

INVENTORS
Julian Pomeroy
Henry W. Larsson
BY
Witter & Kenyon
ATTORNEYS.

THE NORRIS PETERS CO., PHOTO-LITHO., WASHINGTON, D. C.

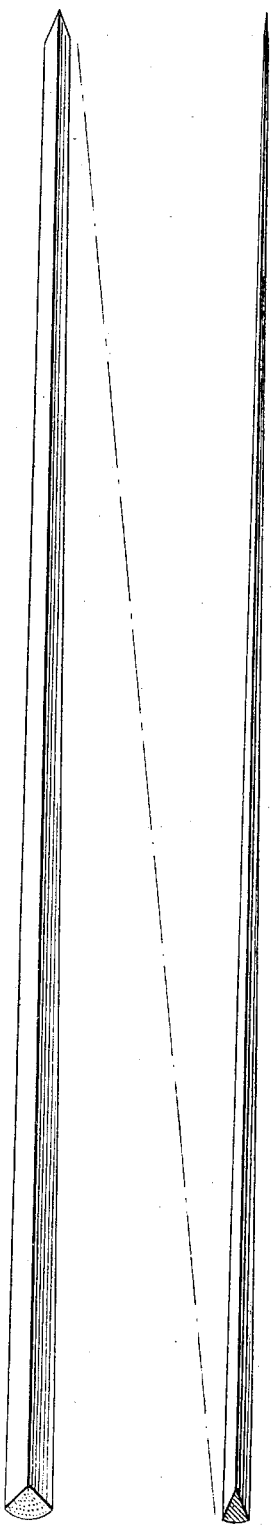

UNITED STATES PATENT OFFICE.

JULIAN POMEROY AND HENRY W. LARSSON, OF SPRINGFIELD, MASSACHUSETTS; SAID LARSSON ASSIGNOR TO SAID POMEROY.

MACHINE FOR PREPARING RATAN.

SPECIFICATION forming part of Letters Patent No. 649,678, dated May 15, 1900.

Application filed July 12, 1898. Serial No. 685,737. (No model.)

*To all whom it may concern:*

Be it known that we, JULIAN POMEROY and HENRY W. LARSSON, citizens of the United States, residing at Springfield, in the county of Hampden, State of Massachusetts, have invented a new and useful Machine for Preparing Strips of Ratan and other Material for Use in Making Whips or other Similar Articles, of which the following is a full, clear, and exact specification, reference being had to the accompanying drawings, which form a part hereof.

The invention relates to a machine for preparing a strip of ratan or other material which has been previously cut from a stalk or larger piece by any suitable means so that the strip will be in condition to be united with other strips to form a completed whip or other article of this kind.

The invention is especially designed for use in connection with the machine for cutting or splitting ratan which is described and claimed in our earlier application, Serial No. 674,570.

In the manufacture of whips by means of our inventions the stalk of ratan or other material is first passed through the machine described in our earlier application and is thereby cut into uniform and tapering strips. These strips are then passed through the machine herein described and claimed and are thereby prepared and fitted for being formed into whips or other similar articles.

One object of the present invention is to provide means whereby a certain portion of the material is removed from the middle of the strip, thereby enabling it to be afterward formed and trimmed, so that when four of such strips are united together they will form a complete article, tapering uniformly toward the smaller end and having a substantially-rounded outline at every point, the skin or enamel of the material being entirely preserved.

Another object of the invention is to provide means whereby the amount of material removed from the middle of the strip can be gradually increased from the butt to the smaller end thereof, so as to enable the strip to be thereafter compressed into the desired shape.

Another object of the invention is to provide means whereby the strip is compressed and properly shaped and the edges of the strip cut off or suitably trimmed.

Other objects of the present invention are to simplify the construction of the machinery used for preparing or treating the strips, to make the operation of the machine entirely automatic, to secure accuracy of operation, and to improve the quality of the product, while decreasing its cost.

The invention is also designed to accomplish other objects, which will be fully described hereinafter.

The invention consists, first, of the combination, in a machine of the character specified, of a cutter of suitable form which is adapted to remove the material from the middle of the strip and a chuck or holding device for holding the strip in proper position with reference to the cutter, one of said parts—that is to say, either the cutter or the chuck—being pivoted or made movable with reference to the other, as a result of which the amount of the material which is removed from the middle of the strip can be gradually changed, so that but little is removed from the part of the strip that is next to the butt portion and more is removed from the tip portion. In the best form of our invention we employ a revolving circular cutter, and we pivot the chuck on an axis which is in the plane of the cutter and passes through the middle of the cutter and is at a right angle to the direction of motion of the strip, or, to describe it in another way, which is in line with the radius of contact with the work, as a result of which when the chuck is turned upon its pivot the cutter makes a wider cut in the strip and removes more of the material therefrom, the cut being always made exactly in the middle of the strip.

The invention also consists in providing means for automatically moving the chuck or movable part. In the best form of our invention this means is controlled by the varying thickness of the strip, whereby as the strip decreases in size the chuck or the movable part is turned more and more on its axis and the cut which is being made in the strip is made wider, and more material is therefore removed therefrom; but it is manifest that the motion of the chuck may be controlled or timed in other ways.

The invention also consists in the special construction and arrangement of the parts of the chuck for holding the strip, including, among other things, jaws which are movable in the chuck and are adapted to hold the strip in a central position therein and means for so connecting the jaws that they will move in and out together, so as to be always at equal distances from the center line of the strip.

The invention also consists in mounting the chuck on an apron which is movable toward or from the cutter and in providing means for operating the apron so that the cutter shall not remove any of the material from the butt portion of the strip, but shall remove material to the proper or desired depth at the other parts of the strip.

The invention also consists in a former or forming device comprising a body-piece provided with suitable grooves and clamping-plates adapted to slide in said grooves and to support and properly form or shape the strip, and means for operating the clamping-plates, and in the combination, with such a forming device, of a suitable trimming-tool adapted to trim the sides of the strip, whereby the strip is properly formed and the enamel on the outer surface of the strip is given the proper curvature and the sides are trimmed so as to be at the proper angle with each other. This part of our invention also consists in suitable means for causing the clamping-plates to move in and out together and at the same rate of speed, so as to hold the strip always in the central position. This part of the invention also consists in the particular construction and arrangement of the different parts of the former. An important feature of this part of the invention consists in providing the clamping-plates with fingers at their inner ends adapted to dovetail with one another, so that the fingers of one plate slide between the fingers of the other plate, and in curving the upper edges of these fingers, so that as the strip becomes smaller, and the clamping-plates are consequently pressed nearer together, the curvature of the supporting-surface formed by the fingers becomes sharper, so as to give a sharper curvature to the enamel or outer face of the strip at that part.

The invention also consists in mounting the former upon an apron and in so timing the motion of the apron as to insure the proper trimming of the sides of the strip.

The invention also consists in the combination of a feed-roller and an apron adapted to be pressed toward the roller at the proper time, so as to cause the strip to be gripped by the roller and fed forward to the cutter and other parts of the machine.

The invention also consists in certain other features of construction and combinations of parts hereinafter described and claimed.

The invention is fully shown in the accompanying drawings, in which—

Figure 2:
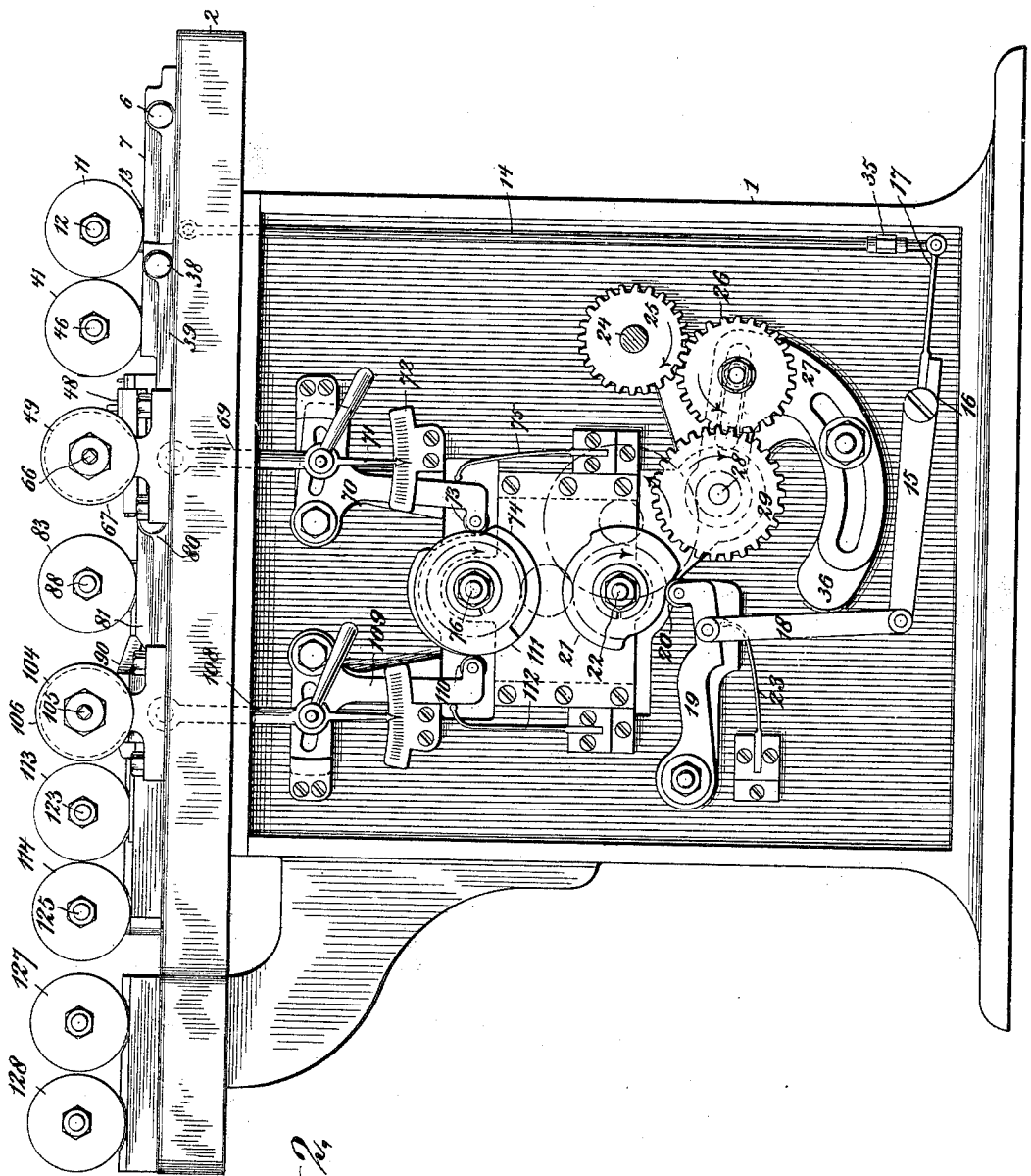
Figure 3:
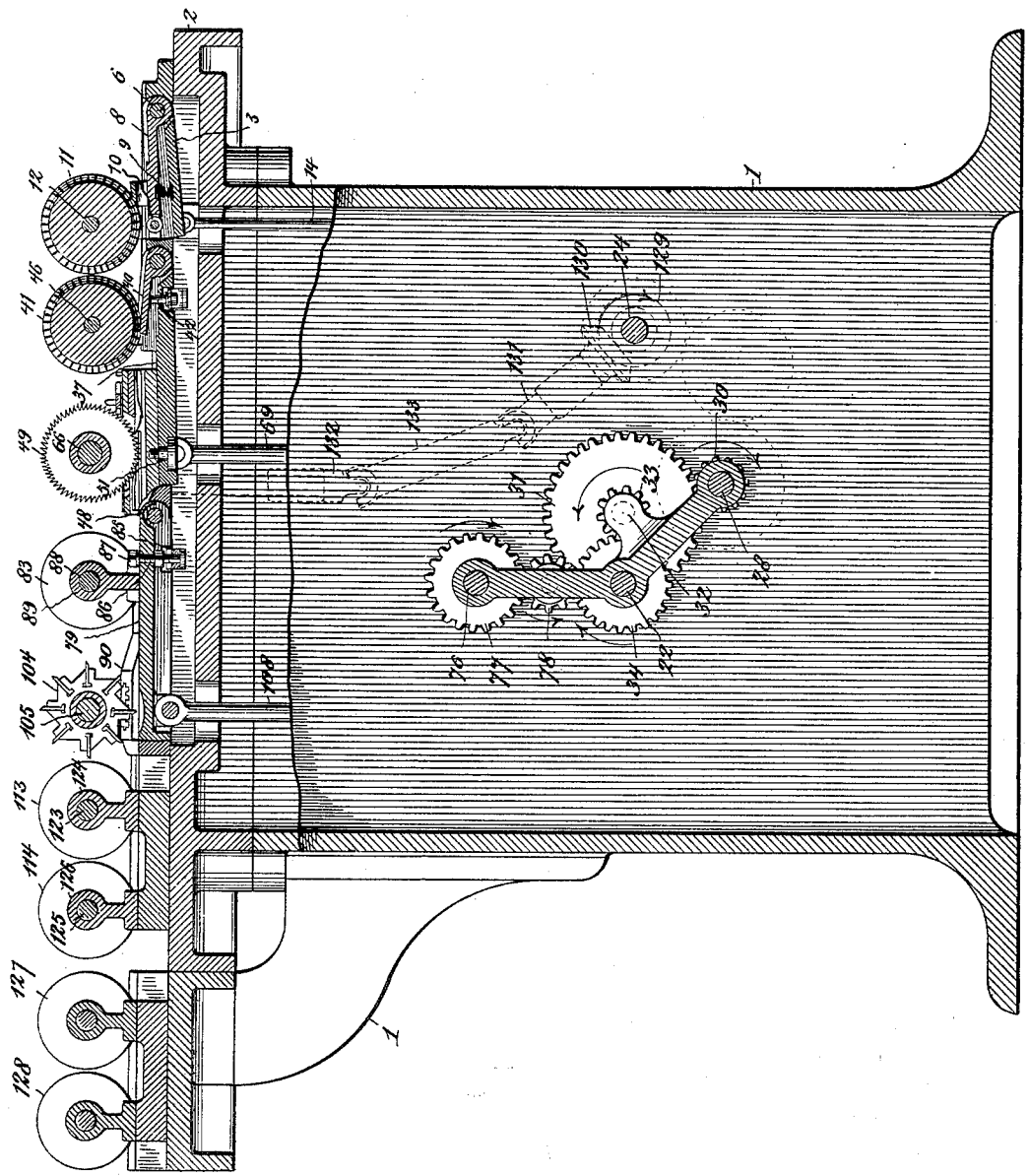
Figure 28:
Figure 26:
Figure 27:
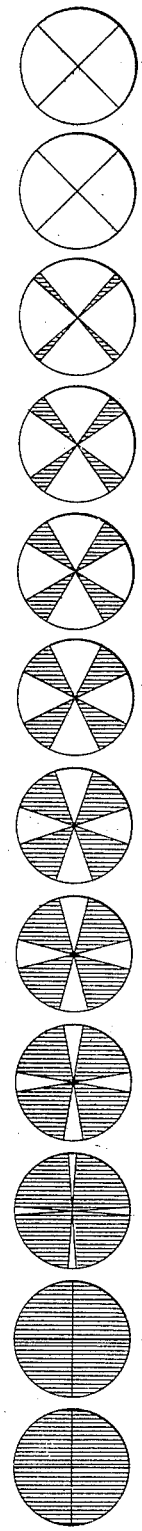
Figure 30:
Figure 29:
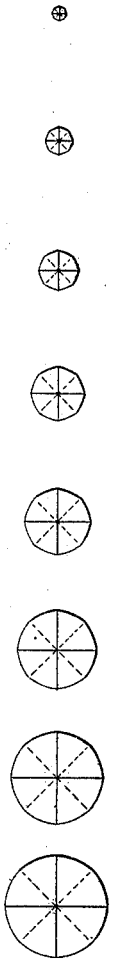

Figure 1 is a plan view of the whole machine. Fig. 2 is a side elevation. Fig. 3 is a section on the irregular line 3 3 of Fig. 1. Fig. 4 is a plan view of the second apron with two clutches mounted thereon. Fig. 5 is a section on the line 5 5 of Fig. 4. Fig. 6 is a detail view of the chuck, the parts being shown in the position assumed when the smallest portion of the strip is passing through the chuck, the jaws having substantially come together. Fig. 7 is a rear view of the same, the parts, however, being in the position assumed when the largest portion of the strip is passing through the chuck and the jaws are therefore open. Fig. 8 is a top view of the chuck with the parts in position as shown in Fig. 7, a portion of the chuck being broken away. Fig. 9 is a section on the line 9 9 of Fig. 8, the parts being in the same relative position as in Fig. 8. Fig. 10 is a central longitudinal section of the parts as shown in Fig. 8. Fig. 11 is a cross-section on the line 11 11 of Fig. 8. Fig. 12 is a detail end view of one of the jaws of the chuck. Fig. 13 is a side elevation of the same. Fig. 14 is a top view of the third apron carrying the formers. Fig. 15 is a detail view of one of the formers, the sliding plates being removed therefrom. Fig. 16 is a front end view of one of the formers. Fig. 17 is a cross-section on the line 17 17 of Fig. 15, the sliding plates being shown in position. Fig. 17$^a$ is a cross-section similar to Fig. 17, showing the clamping-plates nearer together and illustrating the manner in which the curvature of the supporting-surface formed by the fingers of the clamping-plates becomes sharper as the strip becomes smaller. Fig. 18 is a central longitudinal section on the line 18 18 of Fig. 15, the clamping-plates being shown in position in this figure. Fig. 19 is a section on the line 19 19 of Fig. 15, showing the clamping-plates in position. Fig. 20 is a bottom view of one of the clamping-plates. Fig. 21 is a section taken transversely of either the second or the third apron, the plane of the section being taken as on line 21 21 of Fig. 14, the feed-wheels and their supports attached to the apron being also shown in this figure. Fig. 22 is a central longitudinal section taken through the presser-plate and the fourth and fifth feed-wheels. Fig. 23 is a plan view of the presser-plate. Fig. 24 is a cross-section on the line 24 24 of Fig. 23, and Fig. 25 is a front end view of the presser-plate. Fig. 26 is a diagram showing the manner in which we prefer to cut the strips from the stalks of ratan or other material. Fig. 27 represents a series of cross-sections of the stalk when cut in this manner. Fig. 28 consists of a series of cross-sections of one of the strips, the black portions representing the parts of the strip which are removed from the center and the sides by the cutter and the trimmer. Fig. 29 consists of a series of diagrams or cross-sections of four finished strips combined together to form a complete whip. In this figure the full cross-lines represent the dividing-lines between the four strips or segments which combine to make up the whip and the dotted diagonal lines represent the lines of the saw cuts where the material has been removed from the center of the strips and the strips have been squeezed together. Fig. 30 is a side view of the finished whip. The cross-sections in Figs. 27 and 29 are full size and are taken at corresponding points along the whip, as shown in Fig. 30. Figs. 26 and 30 are merely diagrammatical and are not drawn to scale. Fig. 31 represents a strip adapted to be operated on by the machine.

Similar numbers refer to similar parts in the different figures.

1 is the frame of the machine, which is made in any suitable design and which supports at its upper end the table 2, upon which most of the operative parts are carried.

The machine is provided with three aprons, the first apron being marked 3, the second apron being marked 37, and the third apron being marked 79. (See Figs. 1 and 3.) The first apron is pivoted at its front end by means of the pin 6, which turns in bearings in the strips 7, which are bolted or fastened in any suitable way to the table, the apron 3 being fastened to the pin 6, so as to turn therewith.

8 8 are presser-fingers placed in the path of the strips which are fed through the machine and adapted to turn loosely on the pin 6, whereby the fingers 8 are given a motion independently of the apron 3. The finger 8 is pressed upwardly by means of the coiled spring 9, placed between the finger and the apron. The finger is also provided at its rear end and at a point immediately under the feed-roller with an antifriction-roller 10.

11 11 are feed-rollers made in any suitable form. We prefer to provide these feed-rollers with grooves or channels and suitable teeth serving to catch and hold the strip. The feed-rollers are connected with each other by means of a shaft 12, which revolves in a bearing in the supporting-arm 13. This arm 13 is connected rigidly with the frame of the machine, as a result of which the feed-rollers 11 are held in a fixed position.

The rear end of the apron is reciprocated by means of the connecting-rod 14, which is suitably pivoted at its upper end to the apron and is pivoted at its lower end to the lever 15, which lever is pivoted at 16 to the frame of the machine. The forward end of the lever 15 consists of a steel spring-piece 17, which is designed to give the parts a certain elasticity or play to prevent breakage. The rear end of the lever 15 is connected by means of the link 18 with the pivoted arm 19. This arm is pivoted at its rear end to the frame and at its forward end carries the cam-roller 20.

21 is a cam mounted upon the shaft 22. The cam 21 bears against the cam-roller 20 and is adapted to raise the apron 3 by means of the intervening mechanism just described. The cam-roller is pressed upward against the cam by means of a spring 23 or any other suitable device. The cam 21 is provided with three separate surfaces, each of which is concentric with the center of revolution, but which are at different distances therefrom. The cam is driven from the driving-shaft 24 by means of suitable intervening gearing.

25 is a gear-wheel mounted on the shaft 24. (See Fig. 2.)

26 is an idler carried by the arm 27. This arm is pivoted on shaft 28 and is provided with two slots, as shown in Fig. 2. The idler 26 is fastened to the arm 27 by means of a nut-and-bolt connection, the bolt passing through the upper slot of the arm.

29 is a gear-wheel on the shaft 28, which meshes with the idler 26. The shaft 28 passes back through the frame of the machine, (see Fig. 3,) and at its other end carries the small gear-wheel 30. This gear-wheel meshes with the larger gear-wheel 31, which is fastened to the shaft 32. 33 is another gear-wheel on the shaft 32, which meshes with the gear-wheel 34 on the shaft 22, which carries the cam 21. By means of these connecting gears and shafts the cam 21 is driven at a suitable rate of speed. The cam 21 revolves in the direction indicated by the arrow in Fig. 2. In that figure the apron 3 is shown in its lowest position. The butt-end of the strip is inserted at this time between the apron 3 and the feed-roller 11. As the cam 21 revolves the highest surface of the cam passes under the cam-roller, and thereby forces the apron into its highest position and causes the strip to be gripped between the feed-roller and the finger 8 of the apron. The strip is consequently fed forward into the machine. The speed of the feed-rollers of the machine and the speed of the cam 21 are so regulated that the first apron is held up in this position until the butt portion of the strip has reached a point about opposite the last feed-roller. (Shown at the left in Figs. 2 and 3.) The cam-roller 20 then passes down to the middle or intermediate surface of the cam 21, as a result of which the apron is drawn down to an intermediate position. This operates to free the strip from pressure between this apron and the feed-roller 11, while at the same time it does not make the opening wide enough to permit the butt portion of another strip to be inserted. The apron is held in this position until the cam-roller passes down to the lowest surface of the cam 21, when the apron 3 is drawn down to its lowest position, ready for the insertion of another strip.

35 is a turnbuckle device on the rod 14, permitting the length of that rod to be varied, so as to adjust the position of the apron 3.

The speed of the cam 21 can be varied by substituting gear-wheels of different sizes in place of the idler 26. The idler 26 can be fastened in a suitable position on the arm 27 by means of the slot in the upper end of that arm. The arm 27 can be raised or lowered by turning it on the shaft 28 and fastening it in proper position by means of a bolt passing through a slot in the lower end of the arm and screwing into the projecting portion 36 of the frame of the machine. The arm 27 is adapted to slide upon the surface of this projecting portion 36. (See Fig. 2.)

The apron 3 is provided with two fingers 8, and there are two feed-rollers 11, these parts being simply duplicates of each other, so that two strips can be passed through the machine at the same time. (See Fig. 1.)

37 is a second apron, which is hinged to the frame of the machine similarly to the first apron. 38 is a pin fastened to the apron and turning in bearings in strips 39, which are bolted or otherwise suitably fastened to the frame of the machine. The apron 37 turns with the pin 38. The apron is provided at its front end with the spring-pressed fingers 40 40, which are pivoted at one end on the pin 38, so as to turn loosely thereon, and are pressed upward at their other end against the feed-rollers 41. (See Fig. 3.) The special construction of a spring device for pressing the fingers 40 upwardly against the feed-rollers is shown in Fig. 21. 42 42 are pins bearing against the under side of the fingers 40. These pins are suitably connected with the ends of a spring-bar 43. The pins 42 pass through holes in the aprons and are adapted to be moved up and down therein by means of the spring-bar 42, and thereby to press the fingers up against the feed-rollers. The spring-bar 43 is supported at the middle by means of the headed bolt 44. This bolt is secured to the apron 37 by means of nuts 45, as shown in Fig. 21, or in any other suitable manner. By turning the nuts 45 the bolt 44 can be raised or lowered in position and the tension of the spring-bar 43 thereby regulated. The spring-bar tends to constantly press the fingers 40 up against the feed-rollers 41. The two feed-rollers 41 are connected with each other by means of the shaft 46, which turns in a suitable bearing in the support 47, which projects upward from the apron 37. The feed-rollers 41 therefore move with the apron 37 and are always in a fixed position relatively thereto.

The rear end of the apron 37 carries the chucks 48, above which are placed the revolving circular saws or cutters 49. The construction and arrangement of the chucks are clearly shown in Figs. 4 to 13, inclusive. The two chucks are exactly the same in construction and arrangement. 50 is the body portion of the chuck. This is pivoted to the apron 37 on an axis which is substantially in line with the center of the cutter 49 and in the plane of the cutter and in line with its radius of contact with the work. 51 is a screw-pin (see Fig. 3) which passes through the apron 37, and the upper end of which is tapped into a screw-threaded hole 52 in the bottom of the body portion 50 of the chuck. By this means the chuck turns on this pin as an axis. The body portion 50 is provided with inclined grooves 53, one on each side, in which the jaws 54 are adapted to slide. The form and construction of these jaws 54 are clearly shown in Figs. 12 and 13, and their arrangement and movement in the chuck are clearly illustrated in Figs. 6 to 11. The jaws are provided with grooves 55 55, into which the ribs or projections 56 on the body portion 50 project. These ribs 56 act as tracks or guides on which the jaws 54 slide and by which the jaws are made to move in the proper path. The lower edges of the jaws are provided with the teeth 57 to enable the jaws to firmly clamp the strip as it passes through the chuck. One of the jaws is provided along its clamping edge and near its forward end with a recess 58, (see Fig. 6,) adapted to receive and accommodate the edge of the cutter when the chuck is turned upon its pivot. The other jaw is provided near its rear end with a similar recess 59 for the same purpose. The jaws 54 are also provided with the lugs 60, which are adapted to project into grooves in the sliding portion 61 of the chuck. This sliding portion 61 is connected with the body portion 50 by means of a dovetailed connection (shown in Fig. 7) and is adapted to move or slide upon the body portion. The sliding portion is provided with vertical grooves 62, adapted to receive the lugs 60 of the jaws and in which the lugs 60 move up and down. As the lugs 60 of the clamping-jaws project into the grooves 62 it follows that the jaws 54 move back and forth with the sliding portion 61. As they are moved backward and forward they necessarily slide and turn in the grooves 53 in the body portion, and by this means the jaws are opened or closed. It also follows from this construction that the jaws 54 are so connected that they move in and out together, thereby holding the strip always in a central position. 63 63 are springs (see Fig. 4) which are fastened at one end to the forward end of the sliding portion 61 of the chuck and at their other end to the frame of the machine or the apron 37. These springs tend to draw the sliding portion 61 forward and to bring it into the position shown in Fig. 6, thereby closing the jaws 54 on the strip. 64 64 are links which are pivoted at one end to the forward ends of the chucks and at the other end to a support which projects upward from the apron 37. It follows from this construction that as the sliding portion 61 is moved forward on the body portion 50 the chuck is at the same time turned upon its pivot 51, thereby turning the strip with reference to the cutter as the strip becomes smaller in size and causing the cutter to make a wider cut and so to remove more material at the narrow portions of the strip. It is manifest that instead of making the turning of the chuck dependent upon the size of the strip the chuck could be turned positively, its turning being so timed as to remove more of the material at the narrower portions of the strip. 65 is a spring fastened in any suitable way to the body portion 50 and operating to press the strip down against the bottom of the passage or opening in the chuck.

The cutter 49 is a revolving circular saw provided with suitable teeth. The cutters are mounted upon a shaft 66, which is supported at its ends in bearings 67, which are preferably made of a special character, so that they can be very accurately adjusted. We do not herein describe any special form of bearing, as such bearings are well known and form no part of this invention. It is important, however, to have bearings of such a character as will enable the position of the saws to be nicely regulated and the saws to be held accurately in that position during their operation. The shaft 66 is provided with a pulley 68, adapted to receive a belt for driving the cutters. The cutters are driven independently of the feed-rollers and are preferably driven at a high rate of speed.

The apron 37 is raised and lowered by means of the connecting-rod 69. This rod is pivoted at its upper end to the apron in any suitable way. This rod is connected at its lower end with the pivoted arm 70. The arm 70 is provided at its upper end with a curved slot. The lower end of the rod 69 is fastened to the arm 70 by means of a bolt passing through this slot. By this construction the point of attachment of the rod 69 to the arm 70 can be changed, and thereby the throw of the apron 37 can be varied and regulated. By moving the point of attachment farther away from the point at which the arm 70 is pivoted the throw of the apron 37 would be increased. By moving the lower end of the rod 69 in the other direction the throw of the apron would be decreased. 71 is an index-finger attached to the lower end of the rod 69 and projecting over the scale 72. By this means the throw of the apron can be accurately graduated or determined. The lower end of the arm 70 is provided with a cam-roller 73, which is pressed against the cam 74 by means of the spring 75. The cam 74 is mounted on the shaft 76, which at its other end is provided with the gear-wheel 77. (See Fig. 3.) The gear 77 is driven from the gear 34 by means of the intermediate gear or idler 78. The gear 34 is driven from the main driving-shaft 24 by the mechanism already described. The cam 74 is provided with a depressed portion and with a concentric raised portion. While the cam-roller 73 is traveling over the depressed portion, the apron 37 is in its lowest position and is ready to receive the strip that is being fed through the machine. The depressed portion of the cam is of such a length that the apron 37 will remain in its depressed position while the butt portion of the strip is passing underneath the circular saw, as a result of which no part of the material is removed from the center of the strip at the butt portion. When the cam 73 rides upon the raised portion of the cam 74, the apron 37 is raised, and the strip is thereby forced against the revolving cutter and the material is cut out from the middle of the strip. As the raised portion of this cam is concentric, an equal depth of cut in the middle of the strip is secured from the point at which the taper begins to the end of the strip. We prefer to adjust the machine so that this cut will extend down to the skin or enamel, but will not remove any part of the enamel. The depth of the cut could, however, be varied and might be made to extend entirely through the enamel.

When the strip is fed along from the roller 11 and the first apron, it passes between the feed-roller 41 and the finger 40 and is then fed forward until it enters the chuck 48. At this time the chucks are in the position indicated in dotted lines in Fig. 4. The front end of the strip enters the forward end of the channel through the chuck and strikes the front end of the jaws 54 and presses against these jaws and forces them back, thereby opening the jaws and at the same time forcing back the sliding portion 61 of the chuck and bringing the chuck into the position shown in full lines in Fig. 4—that is to say, into line with the path of the strip. The jaws 54 are pressed firmly against the strip through the operation of the spring 63 and hold the strip in a central position in the chuck, at the same time the spring 65 bears down on top of the strip and holds it firmly against the bottom of the channel through the chuck. The cam 74 is so constructed and arranged that the apron 37 remains in its lowest position until the butt portion of the strip has passed under the cutter. Hence no part of the butt portion is removed by the cutter. The apron is then raised and the strip is forced against the saw 49 and the saw cuts away the material from the middle of the strip. Meanwhile the jaws 54 are being firmly pressed against the strip, so as to hold it in a central position by the springs 63. As the strip becomes smaller, the jaws 54 are gradually forced nearer together. At the same time the sliding portion 61 of the chuck is drawn forward by the spring 63 and the chuck is turned upon its pivot. This operates to bend the strip, so that the portion of the strip which is passing through the chuck immediately under the cutter is not in line with the cutter, but is placed diagonally thereto. The cutter therefore makes a broader cut in the middle of the strip and removes more of the material therefrom. The amount of the material so removed is thereby gradually increased as the size of the strip gradually decreases. The amount of material removed is automatically determined by the size of the strip itself. The means for moving the sliding portion of the chuck is controlled by the varying thickness of the strip. As the movable part—that is to say, the chuck—is pivoted on an axis which is substantially in line with the center of the revolving saw, the cut which is made in the strip by the saw is made at the center of the strip, so that at any given point an equal amount of material is removed from both sides of the middle line of the strip. The strip is sufficiently flexible to permit of its being bent by the chuck as the strip becomes smaller, and the jaws are thereby forced toward each other.

79 is the third apron. This is pivoted at its forward end to the frame of the machine in the same way as the first and second aprons. 80 is a pin which is adapted to turn in bearings in the strips 81 81, which are bolted or secured in any other suitable way to the table 2. (See Fig. 1.) The apron 79 is attached to the pin 80, so as to turn therewith. 82 82 are fingers pivoted at one end on the pin 80 and pressed upwardly at the other end by a spring device against the feed-rollers 83 83. The device for pressing the rear ends of the fingers upwardly against the feed-rollers is identical in construction with the spring device for pressing the fingers 40 upwardly against the feed-rollers 41 on the second apron. 84 84 are pins bearing against the under side of the fingers 82 and pressed upwardly against those fingers by the spring-bar 85. This spring-bar is fastened at its middle part to the apron 79 by means of the headed bolt 86 and the nuts 87. The spring-bar 85 tends to force the pins 84 upwardly against the fingers 82, and to thereby press the fingers against the feed-rollers 83 and so to clamp the strip between these parts and to cause it to be fed forward. The feed-rollers 83 are attached to the shaft 88, which turns in a bearing in the support 89, which projects upwardly from the third apron. The feed-rollers 83 therefore move up and down with this apron.

The rear end of the third apron carries the formers 90. (See Figs. 14 to 20.) These formers consist of a body-piece 91, which is provided with a projecting portion 92 at the forward end suitably grooved to form a channel for the strip and with a central opening 93 and with a continuation of the channel for the strip at the rear end at 94. The body portion is also cut away at the rear end on both sides at 95 to form recesses into which the trimming-tool can project. The body portion is also provided with inclined grooves or ways 96. (See Fig. 15.) 97 97 are clamping-plates provided with projections 98 on their under surface, which projections are adapted to slide in the grooves 96 of the body portion of the former. The clamping-plates are also provided with the fingers 99, (see Fig. 20,) which are placed at right angles to the axis of the former and are so arranged that the fingers of one clamping-plate dovetail with the fingers of the opposite clamping-plate, whereby the fingers of one plate slide between the fingers of the other plate. The upper edges of the fingers 99 are curved, as shown at 100 in Figs. 17 and 17ª. This curvature is made substantially the same as the curvature of the outer surface or enamel of the strip at its butt portion, and the fingers are so constructed and arranged that when the jaws are separated just far enough to permit the passage of the butt portion of the whip, as illustrated in Fig. 17, the surfaces of all the fingers 99 will coincide or be in line with one another, so as to form a continuous and uniformly-curved supporting surface for the butt portion of the strip. As the strip gradually becomes smaller and the clamping-plates are consequently forced nearer together the curvature of the supporting-surface formed by the fingers will become sharper, as clearly illustrated in Fig. 17ª, and the outer surface or enamel of the strip will be reshaped and given a sharper curvature, whereby the strip after passing through the machine will be formed or molded so as to be suitable to form a quarter of the completed whip or other article. The clamping-plates are provided also with the jaws 101, which on their inner or opposed surfaces are so shaped as to compress the strip after it has had some of the material removed from its middle part by the cutter and to compact it and give it the proper form before it passes to the trimming-tool. 102 102 are springs which are fastened at one end to the body-piece of the former and at the other end bear against the pins 103 103 on the clamping-plates, as clearly shown in Fig. 14. These springs tend to press the clamping-plates inwardly and force them against the strip, and thereby to properly form the strip.

By reason of the dovetailed arrangement of the fingers 99 on the clamping-plates it follows that these plates necessarily move in and out together, and for this reason clamp the strip always in a central position in the former. The former is secured in place on the apron by any suitable means.

104 104 are trimming-tools of any suitable form or construction. We prefer to employ a revolving circular trimmer, such as illustrated in Fig. 1. These trimming-tools are attached to the shaft 105, which revolves in suitable bearings 106, supported upon the table of the machine. We prefer to use conical bearings which will permit of very fine and accurate adjustment, as it is important to adjust the position of the forming-tools with nicety. We do not herein describe the special form of bearing, as the construction of such bearings is well understood and forms no part of the present invention. The shaft 105 is provided with a pulley 107, adapted to receive the belt and by means of which the forming-tools can be independently rotated. It is necessary to revolve these tools at a much higher rate of speed than is given to the feed-rollers. If desired, the trimming-tool can be so shaped that in addition to trimming the sides of the strip it will cut away a small portion of the material from the inner edge thereof, so that when the strips are combined to form a whip there will be a central hole or recess adapted to receive a central core of any suitable material.

The apron 79 is raised and lowered by means of the connecting-rod 108, which is pivoted at its upper end to the apron and is attached at its lower end to the pivoted arm 109. (See Figs. 2 and 3.) The upper end of the arm 109 is provided with a curved slot, and the rod 108 is fastened to the arm 109 by means of a bolt passing through this slot. By means of this connection the lower end of the rod 108 can be attached to the arm at a greater or less distance from the point at which the arm 109 is pivoted, and the throw of the apron 79 can thereby be regulated. The lower end of the arm 109 carries the cam-roller 110, which is pressed against the cam 111 by means of the spring 112. The cam 111 is attached to the shaft 76, which is driven from the main driving-shaft 24 by the intervening mechanism already described. The cam 111 is provided with a cam-surface the lowest part of which is concentric for a short distance, so that the trimming-tool will not cut off anything from the sides of the strip at the butt portion thereof, or, if it does remove any material at this point, will remove it equally along the entire butt portion. The rest of the surface of the cam 111 is in the form of a true spiral and operates to raise the apron, and thereby the material gradually, toward the trimming-tool, as a result of which more and more of the strip will be cut away by the trimming-tool toward the tip or pointed end of the strip. In this way the sides of the strip will be so trimmed that the strip will be adapted when combined with three other strips of the same kind to form a complete whip or other article.

When the strip passes away from the cutters 49, it is wholly or partly divided by the cut which has been made along the middle thereof. It passes between the fingers 82 and the feed-rollers 83 and is fed into the former 90. The jaws 101 of the former are normally pressed toward each other into their nearest position. When the butt of the strip strikes the forward ends of these jaws, which are inclined or beveled, it forces them apart until they are brought to the position illustrated in Fig. 17. The butt portion of the strip then passes between these jaws, and the two parts of the strip which were partially or wholly separated by the cutters 49 are pressed together, so that the strip is made compact and solid, the groove or cut along the center line being in this way closed up. At the same time as the strip gradually diminishes in size the jaws are pressed closer together and the increased curvature of the fingers 99 properly forms or molds the rounded or enameled surface of the strip. The strip is thus formed or molded by the former 90. As soon as the strip passes away from the jaws 101 it passes under the trimming-tool 104, which trims the sides of the strip, so that they are at the proper angle, preferably a right angle, to each other. When the strip passes away from the trimmer and the former, it has the shape of an exact quarter of a completed whip. It will be seen that the cutter 49, by removing a certain part of the material from the middle of the strip, enables the gradually-tapering strip to be re-formed and its outer shell or enamel to be changed in curvature, so as to form substantially a quarter of a circle at all points along the strip.

In Figs. 22 to 25 is shown a device for pressing the finished strip up against the fourth and fifth feed-rollers, which are numbered 113 and 114, respectively. This device consists of a channeled strip of metal 115 and a presser-plate 116. The presser-plate is adapted to move up and down in the channel or groove in the strip 115 and is guided in this motion by the pins 117, which are fastened to the strip 115 and extend into slots 118 in the presser-plate. The presser-plate rests upon the coiled springs 119, by which it is pressed up against the feed-rollers 113 and 114. The presser-plate is provided with recesses or depressions 120, adapted to receive the feed-rollers 113 and 114. 121 is a nosepiece adapted to receive the strip when it passes back from the trimming-tool and to guide it into the proper position between the presser-plate and the feed-rollers. The nosepiece 121 is connected with strip 115 by the spring-pieces 122, which are screwed at one end or otherwise suitably secured to the strip 115. These spring-pieces cause the nosepiece 121 to be pressed down upon the strip with a yielding pressure, and thereby hold it and guide it in place. The feed-rollers 113 are attached to the shaft 123, which is adapted to turn in a suitable bearing 124, supported from the table of the machine. The feed-rollers 114 are in like manner connected to the shaft 125, which is adapted to turn in bearing 126, similarly supported from the table of the machine. 127 and 128 are additional feed-rollers similarly mounted in bearings supported from the table of the machine. All the feed-rollers are driven at a uniform rate of speed and are connected with the main driving-shaft 24. 129 is a beveled gear-wheel on the shaft 24. (See Fig. 3.) This gear-wheel meshes with a similarly-beveled gear-wheel 130 on the shaft 131, which is mounted in bearings in the machine in any suitable manner. Shaft 131 is connected with the vertical shaft 132 by any suitable device, such as an intervening rod 133, connected at its ends with the two shafts by means of a knuckle or other universal or flexible joint. Shaft 132 is provided at its upper end with gear-wheel 134, (see Fig. 1,) which meshes with a beveled gear-wheel 135, which is attached to the horizontal shaft 136. Each couple of feed-rollers is connected with the shaft 136 by means of the gears 137 and 138, the shaft 139, and the intervening rod 140, which is connected at one end with the shaft 139 and at the other end with the shaft for the feed-rollers by means of any suitable knuckle-joint or flexible joint, such as is shown in Fig. 1. The rod 140 is made in two parts, which are keyed together, so that the parts may slide upon each other and the rods be thereby lengthened or shortened, while the two parts necessarily revolve with each other. In this way the feed-rollers are continuously revolved and the connection is maintained, although some of the feed-rollers are raised and lowered continually by the operation of the aprons.

The fingers connected with the different aprons are suitably grooved to form a channel or passage-way for the strip and also to make room for the parts of the feed-rollers that project down close to the fingers.

The operation of the machine, briefly stated, is as follows: A stalk of ratan or similar material is first cut or split into eight equal parts in the manner illustrated in Figs. 26 and 27 and fully described in our previous application, Serial No. 674,570, filed on the 21st day of March, 1898, in which we described and claimed a machine adapted for cutting the stalk in this manner. One of the eight strips into which the stalk is thus cut and which is provided with a uniform butt portion and a tapering portion is illustrated in Fig. 31. The butt-end of this strip is introduced into the machine by inserting it between the finger 8 and the feed-roller 11, the first apron 3 being in its lowest position, as represented in Figs. 2 and 3. As the cam 21 revolves the first apron is raised. The strip is caught between the feed-roller 11 and the finger 8 and is fed forward to the second apron, which is still in its lowest position. The butt-end of the strip passes between the finger 40 and the feed-roller 41 and enters the chuck 48 and strikes against the jaws 54 in the chuck, forcing them apart and moving them back and at the same time moving back the sliding portion 61 and moving the chuck upon its pivot 51 until it is in line with the path of motion of the strip. The second apron remains in its lowest position until the butt portion has passed underneath the saw 49. Then the second apron is raised at once to its highest position, and the saw 49 saws out or removes the material from the middle of the strip down to the outer skin or enamel of the strip or to such point as may be desired. As the strip diminishes in size the jaws 54 close in upon the strip, always holding it in a central position, the chuck meanwhile turning upon its pivot by means of the operation of the spring 63 and the saw 49 making a cut of gradually-increasing width toward the tip of the strip. The character of this central cut made by the saw is illustrated in Fig. 28 by the black portion in the middle of the strip, which extends down as far as the enamel. It will be seen that this cut is narrow near the butt, but gradually increases in width toward the tip. The purpose of thus automatically removing more and more material from the middle of the strip as the strip grows smaller is to enable the skin or enamel of the strip to be bent around more and more by the former toward the tip, so as to make this skin or enamel form substantially a quarter of a circle at all points. The strip then passes to the third apron and is fed forward between the fingers 82 and the feed-rollers 83 until it enters the former 90. In the former the two parts or halves of the strip that have been previously separated or partially separated by the saw are pressed together and the strip is formed so that the enamel has the proper curvature at each point, and the strip then passes underneath the trimmer, which trims off the sides. The third apron is gradually raised while the tapering portion of the strip passes underneath the trimmer, so as to trim off more and more of the material upon the sides of the strip toward the tip thereof. The action of the trimmers is represented in Fig. 28 by the black portions on the two sides of the strip, these black portions representing the amount of material cut away by the trimmer. At the larger portion of the strip (represented at the left in Fig. 28) but a small amount of material is removed from the sides thereof; but as the strip diminishes in size the amount of the material cut off is increased. The strip then passes between the feed-rollers 113 and 114 and the presser-plate 116 and then under the feed-rollers 127 and 128 and then out of the machine. The completed strip will have the form of an exact quarter of a completed whip, so that when four of the strips are assembled, as represented in Fig. 29, they will form a complete whip round at every point and with the enamel entirely preserved and entirely encircling the whip from the butt portion to the tip. It will be observed that in this operation no part of the enamel is removed or destroyed and that the completed whip is round and does not need any further turning or shaping. None of the enamel has to be cut away, and no filling-pieces of any kind need to be used, although, as already explained, a central core may be used, if desired.

Many advantages are secured by this invention. It is primarily designed for use in connection with the machine described in our previous application; but it is obvious that it may be used to finish or prepare strips which have been previously cut by any method or machine. The strips are treated and finished with great rapidity, and the entire operation is automatic. The amount of material that is removed from any portion of the strip is automatically determined by the size of the strip at that particular point, and for this reason the exactly-proper amount of material is removed to enable the remaining portions of the strip to be bent and compressed together, so as to give the proper curvature to the enamel at that point to enable it to be combined with other strips similarly treated to form a complete and perfect whip or other article round at every point without any subsequent trimming. In the former the shape which is given to the enamel of the strip is automatically regulated by the size of the strip at that point, which leads to the result just explained.

What we claim as new, and desire to secure by Letters Patent, is—

1. In a machine for preparing strips of ratan and other material, the combination of a cutter adapted to remove the material from the middle of the strip, and a chuck for holding the strip in proper position with reference to the cutter, one of said parts being movable on an axis which is in the plane of the cutter and passes through the middle of the cutter and is at a right angle to the direction of motion of the strip whereby the amount of material removed can be gradually increased from one end of the strip to the other.

2. In a machine for preparing strips of ratan and other material, the combination of a revolving circular cutter adapted to remove the material from the middle of the strip, and a chuck for holding the strip in proper position with reference to the cutter, one of said parts being movable on an axis in the plane of the cutter and in line with its radius of contact with the work whereby the amount of material removed can be gradually increased from one end of the strip to the other, and the cut is always made exactly in the middle of the strip.

3. In a machine for preparing strips of ratan and other material, the combination of a revolving circular cutter adapted to remove the material from the middle of the strip, and a chuck for holding the strip in proper position with reference to the cutter, one of said parts being movable on an axis in the plane of the cutter and in line with its radius of contact with the work, and means for automatically moving said part whereby the amount of material removed is gradually increased from one end of the strip to the other, and the cut is always made exactly in the middle of the strip.

4. In a machine for preparing strips of ratan and other material, the combination of a revolving circular cutter adapted to remove the material from the middle of the strip, and a chuck for holding the strip in proper position with reference to the cutter, one of said parts being movable on an axis in the plane of the cutter and in line with its radius of contact with the work, and means for moving that part, said means being adapted to be controlled by the varying thickness of the strip, whereby as the strip decreases in size, a larger amount of material is removed from the middle thereof.

5. In a machine for preparing strips of ratan and other material, the combination of a cutter adapted to remove the material from the middle of the strip, and a chuck for holding the strip in proper position with reference to the cutter, the chuck being pivoted to the machine on an axis in the plane of the cutter and in line with its radius of contact with the work, and means for turning the chuck on its pivot as the strip varies in size.

6. In a machine for preparing strips of ratan and other material, the combination of a revolving circular cutter adapted to remove the material from the middle of the strip, and a chuck for holding the strip in proper position with reference to the cutter, the chuck being pivoted to the machine on an axis in the plane of the cutter and in line with its radius of contact with the work and provided with jaws to clamp the strip in a central position, and means for turning the chuck on its pivot as the strip varies in size.

7. In a machine for preparing strips of ratan or other material, the combination of a revolving circular cutter, a chuck for holding the strip, pivoted to the machine below the cutter, jaws in the chuck to hold the strip in a central position, means for connecting the jaws so that they will move in and out together, and means for turning the chuck on its pivot as the strip varies in size whereby, as the strip decreases in size, a larger amount of material is removed from the middle thereof.

8. In a machine for preparing strips of ratan or other material, the combination of a revolving circular cutter, a chuck for holding the strip consisting of a body portion pivoted to the machine on an axis in the plane of the cutter and in line with its radius of contact with the work, and provided with inclined grooves, jaws adapted to slide in said grooves and to hold the strip in a central position, a sliding portion connected with the jaws so as to move them in or out together in the grooves and means tending to move the sliding piece so as to press the jaws against the strip and at the same time to turn the body portion on its pivot so as to remove more material at the narrower portions of the strip.

9. In a machine for preparing strips of ratan and other material, the combination of a revolving circular cutter adapted to remove the material from the middle of the strip, and a chuck for holding the strip in proper position with reference to the cutter, one of said parts being automatically movable on an axis in the plane of the cutter and in line with its radius of contact with the work whereby the amount of material removed is gradually increased from one end of the strip to the other, and the cut is always made exactly in the middle of the strip, and an apron carrying the chuck and means for raising and lowering the apron.

10. In a machine for preparing strips of ratan and other material, the combination of a cutter adapted to remove the material from the middle of the strip, and a chuck for holding the strip in proper position with reference to the cutter, the chuck being pivoted to the machine on an axis in the plane of the cutter and in line with its radius of contact with the work, means for turning the chuck on its pivot as the strip varies in size, and an apron carrying the chuck and means for raising and lowering the apron.

11. In a machine for preparing strips of ratan or other material, the combination of a revolving circular cutter, a chuck for holding the strip, pivoted to the machine below the cutter, jaws in the chuck to hold the strip in a central position, means for connecting the jaws so that they will move in and out together, means for turning the chuck on its pivot as the strip varies in size, and an apron carrying the chuck and means for lowering the apron while the butt portion of the strip is passing under the cutter, and for raising it while the tapering portion of the strip is passing under the cutter.

12. In a machine for preparing strips of ratan or other material, the combination of a revolving circular cutter, a chuck for holding the strip consisting of a body portion pivoted to the machine on an axis in the plane of the cutter and in line with its radius of contact with the work, and provided with inclined grooves, jaws adapted to slide in said grooves and to hold the strip in a central position, a sliding portion connected with the jaws so as to move them in or out together in the grooves, a spring tending to move the sliding portion on the body portion so as to press the jaws against the strip, and a pivoted link connected with the sliding portion and tending to turn the chuck on its pivot as the sliding portion moves, so as to cause more material to be removed at the narrower portions of the strip, substantially as set forth.

13. In a machine for preparing strips of ratan or other material, the combination of a suitable cutter and a chuck for holding the strip, consisting of the body portion 50 pivoted to the machine, and provided with the inclined grooves 53, the jaws 54 adapted to slide in the grooves 53 and having the lugs 60, the sliding portion 61 provided with the grooves 62, the springs 63, and the link 64, substantially as set forth.

14. In a machine for preparing strips of ratan or other material, the combination of a suitable cutter and a chuck for holding the strip consisting of the body portion 50 pivoted to the machine in the plane of the cutter and in line with its radius of contact with the work, and provided with inclined grooves 53 and the ribs 56, the jaws 54 having the grooves 55, and the lugs 60, and the recesses 58 and 59, the sliding portion 61 having the grooves 62, the spring 63, the link 64, and the spring 65, substantially as set forth.

15. In a machine for preparing strips of ratan or other material, the combination of a revolving circular saw and a chuck for holding the strip consisting of the body portion 50 pivoted to the apron on an axis in the plane of the cutter and in line with its radius of contact with the work, and provided with the inclined grooves 53, the jaws 54 adapted to slide in the grooves 53 and having the lugs 60, the sliding portion 61 provided with the grooves 62, the spring 63, the link 64 and the apron 37, and means for operating the apron.

16. In a machine for preparing strips of ratan or other material, the combination of a revolving circular cutter, a chuck for holding the strip, pivoted to the apron below the cutter, means for turning the chuck on its pivot as the strip varies in size, a pivoted apron carrying the chuck, a feed-roller carried by the apron, a presser-finger pivoted on the apron, a spring tending to press the finger against the feed-roller, and means for operating the apron.

17. In a machine for preparing strips of ratan or other material, the combination of a revolving circular cutter, a chuck for holding the strip, pivoted to the apron below the cutter, means for turning the chuck on its pivot as the strip varies in size, the apron 37, pivoted at one end to the machine, the cam 74, means for revolving the cam, the cam-follower 73, the spring 75 and means for connecting the cam-follower and the apron, whereby the apron is held in its lowest position while the butt-end of the strip is passing through the chuck and is then raised to its highest position and held there while the tapering portion is passing through the chuck.

18. In a machine for preparing strips of ratan or other material, the combination of a revolving circular cutter, a chuck for holding the strip, pivoted to the apron below the cutter, means for turning the chuck on its pivot as the strip varies in size, the apron 37, pivoted at one end to the machine, the connecting-rod 69, the pivoted arm 70 provided with a curved slot for the attachment of the arm 69, the index-finger 71, the scale 72, the cam-roller 73, the cam 74, means for revolving the cam, and the spring 75.

19. In a machine for preparing strips of ratan or other material, the combination of a feed-roller, an apron underneath the roller, a finger pivoted on the apron, means for pressing the finger up against the roller with a yielding pressure, and means for operating the apron.

20. In a machine for preparing strips of ratan or other material, the combination of the feed-rollers 41 carried by the apron, the apron 37 pivoted at one end to the machine, the presser-fingers 40 pivoted to the apron, the spring-bar 43 for pressing the fingers up against the roller, and means for operating the apron.

21. In a machine for preparing strips of ratan or other material, a former consisting of a body-piece provided with grooves, and clamping-plates adapted to slide in the grooves and having the shape which is to be imparted to the outer surface of the strip, and means for pressing the clamping-plates against the strip whereby the strip is supported and at the same time shaped.

22. In a machine for preparing strips of ratan or other material, a former consisting of a body-piece provided with grooves, and clamping-plates adapted to slide in the grooves, the clamping-surfaces of the clamping-plates being curved so that, where the strip is smaller and the clamping-plates are consequently nearer together, the curvature of the supporting-surface formed by the clamping-plates will be sharper so as to give a sharper curvature to the outer face of the strip at that part, means for operating the clamping-plates, and means for causing them to move in and out together so as to clamp the strip in a central position.

23. In a machine for preparing strips of ratan or other material, a former consisting of a body-piece provided with inclined grooves, clamping-plates adapted to slide in the grooves and having fingers at their inner ends adapted to dovetail with one another so that the fingers of one plate slide between the fingers of the other plate, and means for operating the clamping-plates, whereby the plates move in and out together and support and form the strip in a central position.

24. In a machine for preparing strips of ratan or other material, a former consisting of a body-piece provided with inclined grooves, clamping-plates adapted to slide in the grooves and having fingers at their inner ends adapted to dovetail with one another so that the fingers of one plate slide between the fingers of the other plate, the upper edges of the fingers being curved so that, where the strip is smaller and the clamping-plates are consequently nearer together, the curvature of the supporting-surface formed by the fingers will be sharper so as to give a sharper curvature to the outer face of the strip at that part, and means for operating the clamping-plates, whereby the plates move in and out together and support and form the strip in a central position.

25. In a machine for preparing strips of ratan or other material, a former consisting of the body-piece 91, provided with the inclined grooves 96, the clamping-plates 97, 97, provided with projections 98 adapted to slide in the grooves 96, and with the fingers 99, those on one plate being adapted to dovetail with those on the other, and being curved on their upper surface, and with the jaws 101 adapted to press against the sides of the strip, and means for operating the clamping-plates.

26. In a machine for preparing strips of ratan or other material, a former consisting of the body-piece 91, provided with the inclined grooves 96, the clamping-plates 97, 97, provided with projections 98 adapted to slide in the grooves 96, and with the fingers 99, those on one plate being adapted to dovetail with those on the other, and being curved on their upper surface, and with the jaws 101 adapted to press against the sides of the strip, and the springs 102 adapted to press the clamping-plates against the strip, substantially as set forth.

27. In a machine for preparing strips of ratan or other material, a former consisting of a support or body-piece, clamping-plates adapted to slide on the support and to support and form the strip, and having fingers at their inner ends adapted to dovetail with one another so that the fingers of one plate slide between the fingers of the other plate, the upper edges of the fingers being curved so that where the strip is smaller and the clamping-plates are consequently nearer together, the curvature of the supporting-surface formed by the fingers will be sharper so as to give a sharper curvature to the outer face of the strip at that part, and means for operating the clamping-plates.

28. In a machine for preparing strips of ratan or other material, a former consisting of a support or body-piece, clamping-plates adapted to slide on the support and to support and form the strip, and having fingers at their inner ends adapted to dovetail with one another so that the fingers of one plate slide between the fingers of the other plate, the upper edges of the fingers being curved so that where the strip is smaller and the clamping-plates are consequently nearer together, the curvature of the supporting-surface formed by the fingers will be sharper so as to give a sharper curvature to the outer face of the strip at that part, means for operating the clamping-plates, and means for causing them to move in and out together so as to clamp the strip in a central position.

29. In a machine for preparing strips of ratan or other material, the combination of a former consisting of a body-piece provided with grooves, and clamping-plates adapted to slide in the grooves and having the shape which is to be imparted to the outer surface of the strip, and means for pressing the clamping-plates against the strip whereby the strip is supported and at the same time shaped, and a trimming-tool adapted to trim the sides of the strip.

30. In a machine for preparing strips of ratan or other material, the combination of a former consisting of a body-piece provided with grooves, and clamping-plates adapted to slide in the grooves, the clamping-surfaces of the clamping-plates being curved so that, where the strip is smaller and the clamping-plates are consequently nearer together, the curvature of the supporting-surface formed by the clamping-plates will be sharper so as to give a sharper curvature to the outer face of the strip at that part, means for operating the clamping-plates and means for causing them to move in and out together so as to clamp the strip in a central position, and a trimming-tool adapted to trim the sides of the strip.

31. In a machine for preparing strips of ratan or other material, the combination of a former consisting of a body-piece provided with inclined grooves, clamping-plates adapted to slide in the grooves and having fingers at their inner ends adapted to dovetail with one another so that the fingers of one plate slide between the fingers of the other plate, and means for operating the clamping-plates, whereby the plates move in and out together and support and form the strip in a central position, and a trimming-tool adapted to trim the sides of the strip.

32. In a machine for preparing strips of ratan or other material, the combination of a former consisting of a body-piece provided with grooves, and clamping-plates adapted to slide in the grooves and to support and form the strip and means for operating the clamping-plates, a trimming-tool adapted to trim the sides of the strip, and an apron carrying the former and means for raising and lowering the apron.

33. In a machine for preparing strips of ratan or other material, the combination of a former consisting of a body-piece provided with grooves, and clamping-plates adapted to slide in the grooves and to support and form the strip, means for operating the clamping-plates and means for causing them to move in and out together so as to clamp the strip in a central position, a trimming-tool adapted to trim the sides of the strip, and an apron carrying the former and means for raising and lowering the apron.

34. In a machine for preparing strips of ratan or other material, the combination of a former consisting of a body-piece provided with inclined grooves, clamping-plates adapted to slide in the grooves and having fingers at their inner ends adapted to dovetail with one another so that the fingers of one plate slide between the fingers of the other plate, and means for operating the clamping-plates whereby the plates move in and out together and support and form the strip in a central position, a trimming-tool adapted to trim the sides of the strip, and an apron carrying the former and means for raising and lowering the apron.

35. In a machine for preparing strips of ratan or other material, the combination of a former consisting of a body-piece provided with grooves, and clamping-plates adapted to slide in the grooves and to support and form the strip and means for operating the clamping-plates, a trimming-tool adapted to trim the sides of the strip, an apron carrying the former and means for raising and lowering the apron, and a feed-roller carried by the apron, and a finger pivoted to the apron and means for pressing the finger with a yielding pressure toward the feed-roller.

36. In a machine for preparing strips of ratan or other material, the combination of a former consisting of a body-piece provided with grooves, and clamping-plates adapted to slide in the grooves and to support and form the strip and means for operating the clamping-plates, a trimming-tool adapted to trim the sides of the strip, an apron carrying the former and the connecting-rod 108, the cam 111, the cam-follower 110, means for pressing the cam-follower against the cam, and means for connecting the cam-follower with the rod 108, and means for revolving the cam, substantially as set forth.

37. In a machine for preparing strips of ratan or other material, the combination of a former consisting of a body-piece provided with grooves, and clamping-plates adapted to slide in the grooves and to support and form the strip and means for operating the clamping-plates, a trimming-tool adapted to trim the sides of the strip, an apron carrying the former, the connecting-rod 108, the pivoted arm 109 provided with a curved slot, the cam-roller 110, the cam 111, the spring 112, the shaft 76 and means for revolving the shaft.

38. In a machine for preparing strips of ratan or other material, the combination of the revolving circular trimming-tool 104, a former consisting of the body-piece 91, provided with the inclined grooves 96, the clamping-plates 97, 97, provided with projections 98 adapted to slide in the grooves 96, and with the fingers 99, those on one plate being adapted to dovetail with those on the other, and being curved on their upper surface, and with the jaws 101 adapted to press against the sides of the strip, and means for operating the clamping-plates, the apron 79 pivoted at one end to the machine and carrying the former, the feed-roller 83, the finger 82, and a spring to press the finger against the roller, and means for raising and lowering the apron.

39. In a machine for preparing strips of ratan or other material, the combination of the feed-roller 11, the finger 8, the spring 9, the apron 3, the rod 14, the cam 21, the cam-follower 20, means for pressing the cam-follower against the cam, means for connecting the rod 14 with the cam-follower, and means for revolving the cam.

40. In a machine for preparing strips of ratan or other material, the combination of the feed-roller 11, the finger 8, the spring 9, the apron 3, the rod 14, the pivoted lever 15, the spring-piece 17, the link 18, the pivoted arm 19, the cam 21, the cam-follower 20, the spring 23, the shaft 22, and means for revolving the shaft.

41. In a machine for preparing strips of ratan or other material, the combination of feed-rollers, the channeled strip 115, the presser-plate 116, means for pressing the plate upwardly against the feed-rollers, the nosepiece 121, and the spring-pieces 122.

42. In a machine for preparing strips of ratan or other material, the combination of feed-rollers 113, 114, the strip 115, the presser-plate 116, the pins 117, the slots 118, the springs 119, the nosepiece 121, and the spring-pieces 122, substantially as set forth.

43. In a machine for preparing strips of ratan or other material, the combination of a cutter adapted to remove the material from the middle of the strip, and a chuck for holding the strip in proper position with reference to the cutter, one of said parts being movable with reference to the other whereby the amount of material removed can be gradually increased from one end of the strip to the other, a former consisting of a body-piece provided with grooves and clamping-plates adapted to slide in the grooves and to support and form the strip, and means for operating the clamping-plates and means for feeding the strip through the chuck and former.

44. In a machine for preparing strips of ratan or other material, the combination of a cutter adapted to remove the material from the middle of the strip, and a chuck for holding the strip in proper position with reference to the cutter, the chuck being pivoted to the machine on an axis in the plane of the cutter and in line with its radius of contact with the work, and means for turning the chuck on its pivot as the strip varies in size, a former consisting of a body-piece provided with grooves, and clamping-plates adapted to slide in the grooves and to support and form the strip, means for operating the clamping-plates, and means for causing them to move in and out together so as to clamp the strip in a central position, and means for feeding the strip through the chuck and the former, substantially as set forth.

45. In a machine for preparing strips of ratan or other material, the combination of a revolving circular cutter adapted to remove the material from the middle of the strip, a chuck for holding the strip in proper position with reference to the cutter, the chuck being pivoted to the machine on an axis in the plane of the cutter and in line with its radius of contact with the work, and provided with jaws to clamp the strip in a central position and means for turning the chuck on its pivot as the strip varies in size, a former consisting of a body-piece provided with inclined grooves, clamping-plates adapted to slide in the grooves and having fingers at their inner ends adapted to dovetail with one another so that the fingers of one plate slide between the fingers of the other plate, the upper edges of the fingers being curved so that, where the strip is smaller and the clamping-plates are consequently nearer together, the curvature of the supporting-surface formed by the fingers will be sharper so as to give a sharper curvature to the outer face of the strip at that part, and means for operating the clamping-plates whereby the plates move in and out together and support and form the strip in a central position, and means for feeding the strip through the chuck and the former, substantially as set forth.

46. In a machine for preparing strips of ratan or other material, the combination of a revolving circular cutter, a chuck for holding the strip consisting of a body portion pivoted to the machine on an axis in the plane of the cutter and in line with its radius of contact with the work and provided with inclined grooves, jaws adapted to slide in said grooves and to hold the strip in a central position, a sliding portion connected with the jaws so as to move them in or out together in the grooves, and means tending to move the sliding piece so as to press the jaws against the strip and at the same time to turn the body portion on its pivot so as to remove more material at the narrower portions of the strip, a former consisting of a body-piece provided with inclined grooves, clamping-plates adapted to slide in the grooves and having fingers at their inner ends adapted to dovetail with one another so that the fingers of one plate slide between the fingers of the other plate, the upper edges of the fingers being curved so that, where the strip is smaller and the clamping-plates are consequently nearer together, the curvature of the supporting-surface formed by the fingers will be sharper so as to give a sharper curvature to the outer face of the strip at that part, and means for operating the clamping-plates whereby the plates move in and out together and support and form the strip in a central position, and a trimming-tool, and means for feeding the strip through the chuck and the former, substantially as set forth.

47. In a machine for preparing strips of ratan or other material, the combination of a revolving circular cutter, a chuck for holding the strip consisting of a body portion pivoted to the machine on an axis in the plane of the cutter and in line with its radius of contact with the work, and provided with inclined grooves, jaws adapted to slide in said grooves and to hold the strip in a central position, the sliding portion connected with the jaws so as to move them in or out together in the grooves, and means tending to move the sliding piece so as to press the jaws against the strip and at the same time to turn the body portion upon the pivot so as to remove more material at the narrower portions of the strip, a former consisting of a body-piece provided with grooves, and clamping-plates adapted to slide in the grooves and to support and form the strip, means for operating the clamping-plates and means for causing them to move in and out together so as to clamp the strip in a central position, and a trimming-tool adapted to trim the sides of the strip and means for feeding the strip through the chuck and former, substantially as set forth.

48. In a machine for preparing strips of ratan or other material, the combination of a cutter adapted to remove the material from the middle of the strip, a chuck for holding the strip in proper position with reference to the cutter, the chuck being pivoted to the machine upon an axis in the plane of the cutter and in line with its radius of contact with the work, means for turning the chuck on its pivot as the strip varies in size, an apron carrying the chuck and means for raising and lowering the apron, a former consisting of a body-piece provided with grooves, and clamping-plates adapted to slide in the grooves and to support and form the strip, and means for operating the clamping-plates, a trimming-tool adapted to trim the sides of the strip, an apron carrying the former and means for raising and lowering the apron, and means for feeding the strip through the chuck and the former, substantially as set forth.

49. In a machine for preparing strips of ratan or other material, the combination of a revolving circular cutter, a chuck for holding the strip, pivoted to the machine below the cutter, jaws in the chuck to hold the strip in a central position, means for connecting the jaws so that they will move in and out together, means for turning the chuck on its pivot as the strip varies in size and an apron carrying the chuck, and means for lowering the apron while the butt portion of the strip is passing under the cutter, and for raising it while the tapering portion of the strip is passing under the cutter, a former consisting of a body-piece provided with inclined grooves, clamping-plates adapted to slide in the grooves and having fingers at their inner ends adapted to dovetail with one another so that the fingers of one plate slide between the fingers of the other plate, and means for operating the clamping-plates whereby the plates move in and out together and support and form the strip in a central position, a trimming-tool adapted to trim the sides of the strip, an apron carrying the former and means for raising and lowering the apron and means for feeding the strip through the machine, substantially as set forth.

50. In a machine for preparing strips of ratan or other material, the combination of a suitable cutter and a chuck for holding the strip, consisting of the body portion 50 pivoted to the machine and provided with inclined grooves 53, the jaws 54 adapted to slide in grooves 53 and having the lugs 60, the sliding portion 61 provided with the grooves 62, the spring 63, the link 64, the former consisting of the body-piece 91, provided with inclined grooves 96, clamping-plates 97, 97, provided with projections 98 adapted to slide in the grooves 96, and with the fingers 99, those on one plate being adapted to dovetail with those on the other, and being curved on their upper surface, and with the jaws 101 adapted to press against the sides of the strip, and means for operating the clamping-plates and a suitable trimming-tool, substantially as set forth.

51. In a machine for preparing strips of ratan or other material, the combination of a revolving circular saw, a chuck for holding the strip consisting of the body portion 50 pivoted to the apron on an axis substantially in line with the center of the cutter, and provided with inclined grooves 53, the jaws 54 adapted to slide in the grooves 53 and having lugs 60, the sliding portion 61 provided with the grooves 62, the spring 63, the link 64, the apron 37 and means for operating the apron, a former consisting of a body-piece 91 provided with inclined grooves 96, clamping-plates 97, 97, provided with projections 98 adapted to slide in the grooves 96 and with the fingers 99, those on one plate being adapted to dovetail with those on the other, and being curved on their upper surface, and with the jaws 101 adapted to press against the sides of the strip, and means for operating the clamping-plates, the apron 79 and means for operating the apron and a suitable trimming-tool, substantially as set forth.

52. In a machine for preparing strips of ratan or other material, the combination of a revolving circular saw, a chuck for holding the strip consisting of the body portion 50 pivoted to the apron on an axis substantially in line with the center of the cutter, and provided with inclined grooves 53, the jaws 54 adapted to slide in the grooves 53 and having lugs 60, the sliding portion 61 provided with the grooves 62, the spring 63, the link 64, the apron 37 and means for operating the apron, a former consisting of a body-piece 91 provided with inclined grooves 96, clamping-plates 97, 97, provided with projections 98 adapted to slide in the grooves 96 and with the fingers 99, those on one plate being adapted to dovetail with those on the other, and being curved on their upper surface, and with the jaws 101 adapted to press against the sides of the strip, means for operating the clamping-plates, the apron 79 and means for operating the apron and a suitable trimming-tool, the feed-roller 11, the finger 8, the spring 9, the apron 3, the rod 14, the cam 21, the cam-follower 20, means for pressing the cam-follower against the cam, means for connecting the rod 14 with the cam-follower and means for revolving the cam, substantially as set forth.

53. In a machine for preparing strips of ratan or other material, the combination of a revolving circular saw, a chuck for holding the strip consisting of the body portion 50 pivoted to the apron on an axis substantially in line with the center of the cutter, and provided with inclined grooves 53, the jaws 54 adapted to slide in the grooves 53 and having lugs 60, the sliding portion 61 provided with the grooves 62, the spring 63, the link 64, the apron 37 and means for operating the apron, a former consisting of a body-piece 91 provided with inclined grooves 96, clamping-plates 97, 97, provided with projections 98 adapted to slide in the grooves 96 and with the fingers 99, those on one plate being adapted to dovetail with those on the other, and being curved on their upper surface, and with the jaws 101 adapted to press against the sides of the strip, means for operating the clamping-plates, the apron 79 and means for operating the apron and a suitable trimming-tool, the feed-roller 11, the finger 8, the spring 9, the apron 3, the rod 14, the cam 21, the cam-follower 20, means for pressing the cam-follower against the cam, means for connecting the rod 14 with the cam-follower and means for revolving the cam, the feed-rollers 113, 114, the channeled strip 115, the presser-plate 116, and means for pressing the plate upwardly against the feed-rollers, substantially as set forth.

In testimony whereof we have signed our names to this specification in the presence of two subscribing witnesses.

JULIAN POMEROY.
HENRY W. LARSSON.

Witnesses:
RALPH W. ELLIS,
CARRIE E. BACON.